US010949322B2

(12) United States Patent
Marndi et al.

(10) Patent No.: US 10,949,322 B2
(45) Date of Patent: Mar. 16, 2021

(54) COLLECTING PERFORMANCE METRICS OF A DEVICE

(71) Applicant: Hewlett Packard Enterprise Development LP, Houston, TX (US)

(72) Inventors: Raj Narayan Marndi, Bangalore Karnataka (IN); Mayuri Ravindra Joshi, Bangalore Karnataka (IN); Sagar Ratnakara Nikam, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/378,413

(22) Filed: Apr. 8, 2019

(65) Prior Publication Data

US 2020/0319989 A1 Oct. 8, 2020

(51) Int. Cl.
*G06F 11/30* (2006.01)
*G06F 16/24* (2019.01)
(Continued)

(52) U.S. Cl.
CPC ...... *G06F 11/3466* (2013.01); *G06F 11/3423* (2013.01); *G06F 11/3433* (2013.01);
(Continued)

(58) Field of Classification Search
CPC .... H04L 41/145; H04L 41/12; G06F 11/3082; G06F 11/0751; G06F 11/3409;
(Continued)

(56) References Cited

U.S. PATENT DOCUMENTS 6,311,175 B1 * 10/2001 Adriaans ............. G06F 11/3495
706/25
6,643,613 B2 * 11/2003 McGee ............... G06F 11/0709
700/51
(Continued)

OTHER PUBLICATIONS

Francesco Fusco et al., NET-FLi: On-the-fly Compression, Archiving and Indexing of Streaming Network Traffic , 2010, [Retrieved on Nov. 18, 2020]. Retrieved from the internet: <URL: https://dl.acm.org/doi/pdf/10.14778/1920841.1921011> 12 Pages (1382-1393) (Year: 2010).*

(Continued)

*Primary Examiner* — Anibal Rivera
(74) *Attorney, Agent, or Firm* — Jaffery Watson Mendonsa & Hamilton

(57) ABSTRACT

Some examples relate to collection of performance metrics from a device. In an example, performance metrics for collection from a first device may be selected. The performance metrics may be indexed by assigning an index entry to respective performance metrics on the first device. A fixed sequence of the performance metrics may be maintained on first device. The fixed sequence of the performance metrics along with the index entry assigned to the respective performance metrics may be shared with a second device. A first performance data of the respective performance metrics on first device may be determined. The first performance data of the respective performance metrics may be shared with second device. The sharing may comprise sending, to second device, the index entry and the first performance data of the respective performance metrics in an order corresponding to the fixed sequence of the performance metrics on first device.

18 Claims, 6 Drawing Sheets

(51) Int. Cl.
  *G06F 16/2455* (2019.01)
  *G06F 11/34* (2006.01)
  *G06F 16/2453* (2019.01)
  *G06F 16/23* (2019.01)

(52) U.S. Cl.
  CPC ...... *G06F 11/3006* (2013.01); *G06F 11/3452* (2013.01); *G06F 11/3495* (2013.01); *G06F 16/2358* (2019.01); *G06F 16/24532* (2019.01); *G06F 16/24549* (2019.01); *G06F 16/24554* (2019.01)

(58) Field of Classification Search
  CPC ............. G06F 11/0709; G06F 11/0775; G06F 11/3466; G06F 11/3423; G06F 11/3433; G06F 16/248; G06F 16/22; G06F 16/24578; G06F 11/3452; G06F 11/3006; G06F 11/0793; G06F 11/1662; G06F 11/3495; G06F 16/192; G06F 16/2358; G06F 16/2433; G06F 16/258; G06F 16/278; G06F 16/283; G06F 16/13; G06F 16/2228; G06F 16/2455; G06F 16/24549; G06F 16/2465; G06F 16/24545; G06F 16/90335; G06F 16/24542; G06F 16/27; G06F 16/24554; G06F 16/24532; G06F 16/2282; G06F 16/2272
  See application file for complete search history.

(56) References Cited

U.S. PATENT DOCUMENTS

| | | | |
|---|---|---|---|
| 6,772,411 B2 | 8/2004 | Hayes et al. | |
| 7,444,263 B2* | 10/2008 | White | G06F 11/3409 700/51 |
| 7,631,034 B1* | 12/2009 | Haustein | G06F 9/505 709/201 |
| 7,644,162 B1* | 1/2010 | Zhu | H04L 43/08 709/226 |
| 7,966,524 B2 | 6/2011 | Hayton | |
| 8,175,863 B1 | 5/2012 | Ostermeyer et al. | |
| 8,447,851 B1 | 5/2013 | Anderson et al. | |
| 9,160,447 B1* | 10/2015 | Pillai | H04N 21/64738 |
| 10,061,816 B2* | 8/2018 | Convertino | G06F 16/2358 |
| 2005/0015624 A1* | 1/2005 | Ginter | H04L 63/20 726/4 |
| 2006/0072583 A1 | 4/2006 | Sanda et al. | |
| 2007/0283326 A1* | 12/2007 | Consolatti | G06Q 10/06 717/124 |
| 2008/0021994 A1* | 1/2008 | Grelewicz | H04L 43/0805 709/224 |
| 2010/0281160 A1* | 11/2010 | Ros-Giralt | H04L 43/18 709/224 |
| 2012/0079098 A1* | 3/2012 | Moehler | G06F 11/0793 709/224 |
| 2013/0030761 A1* | 1/2013 | Lakshminarayan | G06F 11/0751 702/179 |
| 2013/0042088 A1* | 2/2013 | Archer | G06F 9/38 712/30 |
| 2014/0006858 A1* | 1/2014 | Helfman | G06F 11/1662 714/19 |
| 2014/0040174 A1* | 2/2014 | Leung | G06F 11/08 706/12 |
| 2014/0220998 A1* | 8/2014 | Kovacs | H04W 28/08 455/453 |
| 2016/0323157 A1 | 11/2016 | Marvasti et al. | |
| 2016/0335260 A1* | 11/2016 | Convertino | G06F 16/2358 |
| 2016/0337226 A1 | 11/2016 | Padala et al. | |
| 2016/0366033 A1 | 12/2016 | Lange et al. | |
| 2017/0085447 A1* | 3/2017 | Chen | H04L 43/024 |
| 2017/0351226 A1* | 12/2017 | Bliss | G05B 19/4063 |
| 2018/0089258 A1* | 3/2018 | Bhattacharjee | G06F 16/2272 |
| 2018/0089259 A1* | 3/2018 | James | G06F 16/2282 |
| 2018/0089262 A1* | 3/2018 | Bhattacharjee | G06F 16/24532 |
| 2018/0089269 A1* | 3/2018 | Pal | G06F 16/24554 |
| 2018/0089278 A1* | 3/2018 | Bhattacharjee | H04L 43/08 |
| 2018/0089312 A1* | 3/2018 | Pal | G06F 16/2465 |
| 2018/0089324 A1* | 3/2018 | Pal | G06F 9/5011 |
| 2018/0287902 A1* | 10/2018 | Chitalia | G06F 11/327 |
| 2018/0316547 A1* | 11/2018 | Kamath Govinda | G06F 16/192 |
| 2018/0316759 A1* | 11/2018 | Shen | H04L 67/1097 |
| 2019/0052551 A1* | 2/2019 | Barczynski | H04L 67/1008 |
| 2019/0095488 A1* | 3/2019 | Bhattacharjee | G06F 16/2228 |
| 2019/0095491 A1* | 3/2019 | Bhattacharjee | G06F 16/2433 |
| 2019/0138419 A1* | 5/2019 | Poghosyan | G06F 11/3006 |
| 2019/0138638 A1* | 5/2019 | Pal | H04L 67/22 |
| 2019/0138639 A1* | 5/2019 | Pal | G06F 40/205 |
| 2019/0138640 A1* | 5/2019 | Pal | G06F 16/27 |
| 2019/0138641 A1* | 5/2019 | Pal | G06F 16/2471 |
| 2019/0138642 A1* | 5/2019 | Pal | G06F 16/27 |
| 2019/0147084 A1* | 5/2019 | Pal | G06F 40/205 707/769 |
| 2019/0147085 A1* | 5/2019 | Pal | G06F 16/24542 707/718 |
| 2019/0147086 A1* | 5/2019 | Pal | G06F 16/24545 707/718 |
| 2019/0147092 A1* | 5/2019 | Pal | G06F 16/90335 707/713 |
| 2019/0163796 A1* | 5/2019 | Hodge | G06F 16/258 |
| 2019/0258632 A1* | 8/2019 | Pal | G06F 16/2465 |
| 2019/0258636 A1* | 8/2019 | Bhattacharjee | G06F 16/2228 |
| 2019/0258637 A1* | 8/2019 | Bhattacharjee | G06F 16/24549 |
| 2019/0272271 A1* | 9/2019 | Bhattacharjee | G06F 16/2455 |
| 2019/0310977 A1* | 10/2019 | Pal | G06F 16/2228 |
| 2019/0317816 A1* | 10/2019 | Chandran | G06N 7/005 |
| 2019/0334795 A1* | 10/2019 | Terayama | H04L 43/08 |
| 2019/0340564 A1* | 11/2019 | Holmquist | H04L 43/0876 |
| 2020/0007405 A1* | 1/2020 | Chitalia | H04L 41/14 |
| 2020/0050586 A1* | 2/2020 | Pal | G06F 16/13 |
| 2020/0050607 A1* | 2/2020 | Pal | G06F 9/4881 |
| 2020/0050612 A1* | 2/2020 | Bhattacharjee | G06F 16/283 |
| 2020/0065303 A1* | 2/2020 | Bhattacharjee | G06F 16/278 |

OTHER PUBLICATIONS

Paolo Ciaccia et al., Searching in Metric Spaces with User-Defined and Approximate Distance, 2002, [Retrieved on Nov. 18, 2020]. Retrieved from the internet: <URL: https://dl.acm.org/doi/pdf/10.1145/582410.582412> 40 Pages (398-437) (Year: 2002).*
"Prometheus—Monitoring system & time series database", available online at <https://web.archive.org/web/20190330171906/https://prometheus.io/>, Mar. 30, 2019, 5 pages.
Openstack Wiki, "Monasca", 2014, available online at <https://web.archive.org/web/20190209055844/https://wiki.openstack.org/wiki/Monasca>, Feb. 9, 2019, 15 pages.
Server Density, "25 Monitoring and Alerting Tools", Aug. 1, 2016, available online at <https://blog.serverdensity.com/25-monitoring-and-altering-tools/>, 8 pages.
Rackspace.com, "Rackspace Monitoring Concepts"; printed on Jul. 9, 2018 from https://developer.rackspace.com/docs/rackspace-monitoring/v1/getting-started/concepts/; 5 pages.
Thalheirn et al.; "Sieve: Actionable Insights From Monitored Metrics in Distributed Systems"; Dec. 11, 2017; 14 pages.

* cited by examiner

| PERFORMANCE METRIC | INDEX ENTRY |
|---|---|
| CPU UTILIZATION | M1 |
| MEMORY UTILIZATION | M2 |
| STORAGE UTILIZATION | M3 |
| NETWORK UTILIZATION | M4 |
FIG. 2
FIG. 3
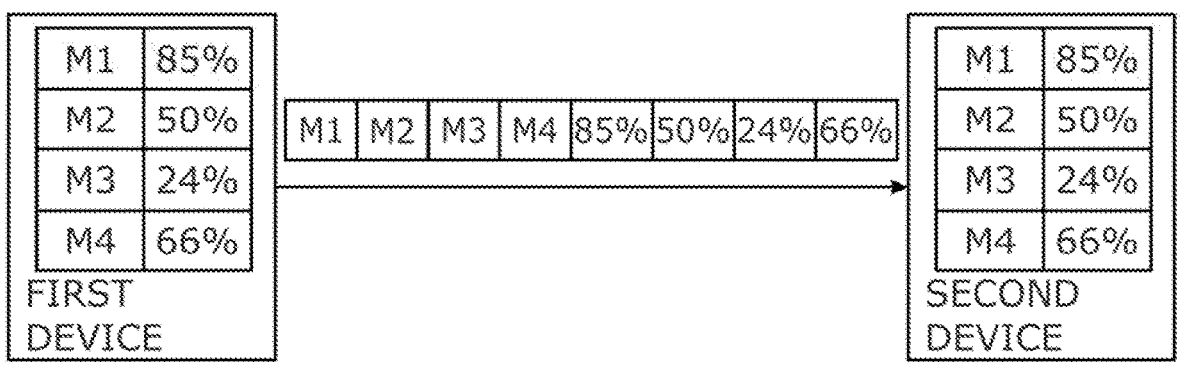
FIG. 4

COLLECTING PERFORMANCE METRICS OF A DEVICE

BACKGROUND

Information technology (IT) infrastructures of organizations have grown in complexity over the last few decades. A typical IT infrastructure such as a data center of an enterprise may include multiple information technology resources such as servers, computer systems, switches, storage devices, storage area networks, computer applications, etc.

BRIEF DESCRIPTION OF THE DRAWINGS

For a better understanding of the solution, examples will now be described, with reference to the accompanying drawings, in which:

FIG. 2 is a block diagram of example performance metrics and index entries assigned thereto;

FIG. 3 is a block diagram of an example transfer of index entries in a fixed sequence;

FIG. 4 is a block diagram of an example transfer of index entries and performance values in a fixed sequence;

DETAILED DESCRIPTION

An information technology infrastructure of an enterprise may comprise of a few to thousands of information technology resources. It may be desirable to have a solution that monitors these resources, collects performance metrics related thereto, and provides a feedback related to their status and functioning.

The term "information technology (IT) infrastructure" may be defined as a combined set of hardware, software, networks, facilities, etc. in order to develop, test, deliver, monitor, control or support IT services. Also, as used herein, the term "resource" may refer to a software and/or a hardware component that may be accessible locally or over a network. Some non-limiting examples of a resource may include a server, a router, and a disk drive.

Collecting metrics from resources and then transferring them to a metrics server for further processing is a continuous process. Usually metrics collection may occur in small intervals, e.g., once every minute; however it can go up or down depending on the requirement of an application. Typically, for each metric, complete information such as a metrics identifier, a timestamp of the metric and a value of the metric is sent. From each resource, several metrics may be collected at periodic time intervals. In a scenario where there may a large number of resources (e.g., a hybrid cloud, a datacenter, etc.), each creating data for several metrics that may get transferred at regular intervals, the process may not only generate a large amount of network traffic, but also consume vast computing power both at the source and a receiver.

To address this issue, the present disclosure describes various examples for collecting performance metrics from a device. In an example, performance metrics for that are to be collected from a first device may be selected. The performance metrics may be indexed by assigning an index entry to the respective performance metrics on the first device. In an example, sequential indexing may be fused. A fixed sequence of the performance metrics may be maintained on the first device. The sequence number in this fixed sequence may be treated as the index for that entry. The fixed sequence of the performance metrics along with the index entry assigned to the respective performance metrics may be shared with a second device. A first performance data of the respective performance metrics on the first device may be determined. The first performance data of the respective performance metrics may be shared with the second device. In an example, the sharing may comprise sending, to the second device, the index entry and the first performance data of the respective performance metrics in an order corresponding to the fixed sequence of the performance metrics on the first device.

The present disclosure provides an effective method of collecting performance metrics by reducing the data transfer frequency and the amount of data transferred.

Figure 1:
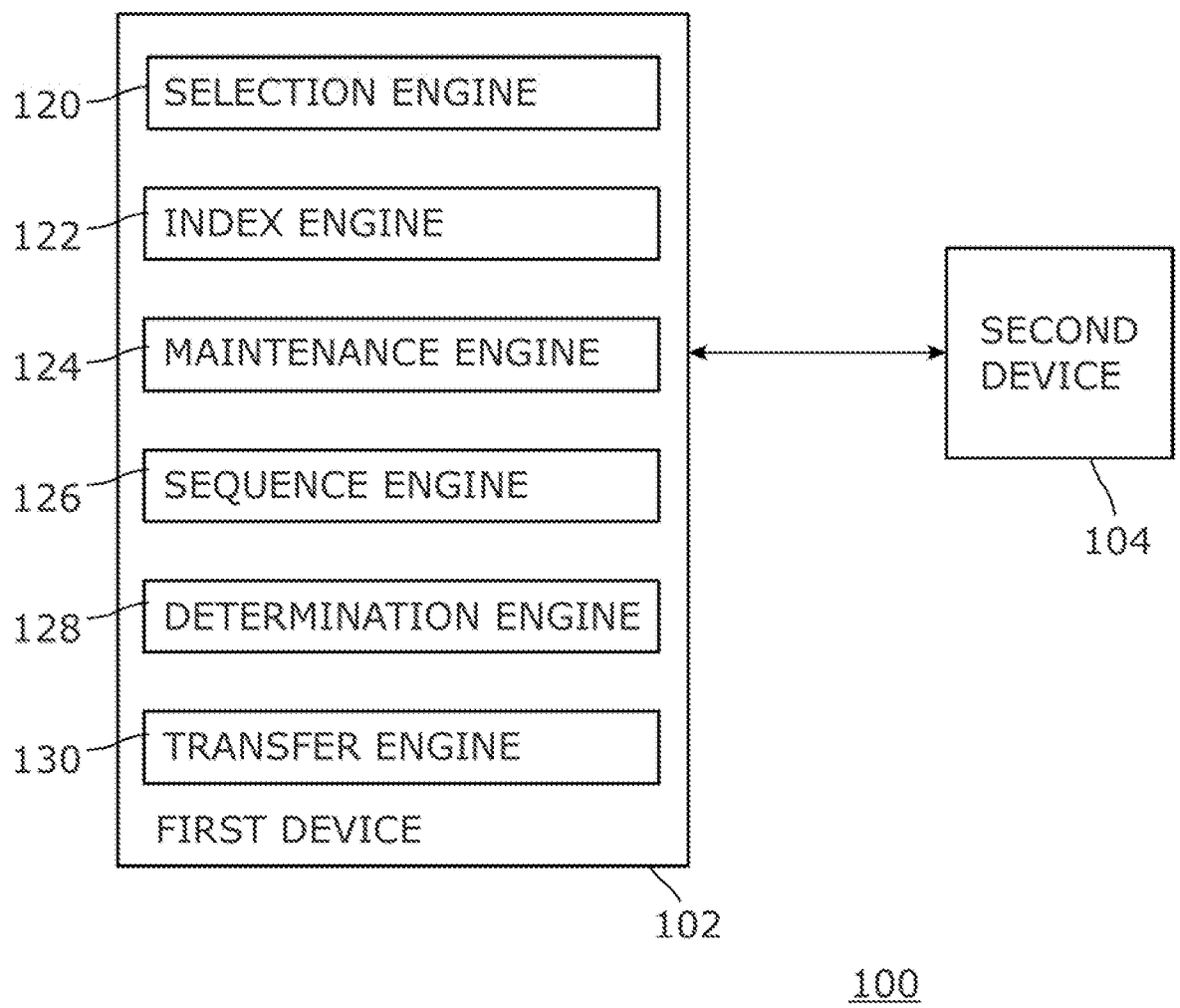
FIG. 1 is a block diagram of an example computing environment for collecting performance metrics of a device.

FIG. 1 is a block diagram of an example computing environment 100 for collecting performance metrics. In an example, computing environment 100 may include a first device 102 and a second device 104. In an example, computing environment 100 may be part of an information technology infrastructure of an organization which may include, for example, a datacenter or a cloud computing system (e.g., a hybrid cloud). Although two devices are shown in FIG. 1, other examples of this disclosure may include more than two devices.

In an example, first device 102 and second device 104 may each be a computing device which may include any type of computing system that is capable of executing machine-readable instructions. Examples of the computing device may include, without limitation, a server, a desktop computer, a notebook computer, a tablet computer, a thin client, a mobile device, and a personal digital assistant (PDA).

In an example, first device 102 may be a network device. Examples of the network device may include, without limitation, a network router, a virtual router, a network switch, and a virtual switch.

In an example, first device 102 may be a storage device. Examples of the storage device may include, without limitation, a non-transitory machine-readable storage medium that may store, for example, machine executable instructions, data file, and metadata related to a data file. Some non-limiting examples of a non-transitory machine-readable storage medium may include a hard disk, a storage disc (for example, a CD-ROM, a DVD, etc.), a disk array, a storage tape, a solid state drive, a Serial Advanced Technology Attachment (SATA) disk drive, a Fibre Channel (FC) disk drive, a Serial Attached SCSI (SAS) disk drive, a magnetic tape drive, and the like. The storage device may be a direct-attached storage i.e. storage that is directly attached to a node. In an example, the storage device may be an external storage (for example, a storage array) that may communicate with a node via a communication interface.

In an example, first device 102 and second device 104 may be communicatively coupled, for example, via a computer network. The computer network may be a wireless or wired network. The computer network may include, for example, a Local Area Network (LAN), a Wireless Local Area Network (WAN), a Metropolitan Area Network (MAN), a Storage Area Network (SAN), a Campus Area Network (CAN), or the like. Further, computer network may be a public network (for example, the Internet) or a private network (for example, an intranet). In an example, first device 102 and second device 104 may be directly attached, for example, through a cable.

In an example, first device 102 may include a selection engine 120, an index engine 122, a maintenance engine 124, a sequence engine 126, a determination engine 128, and a transfer engine 130.

In an example, first device 102 may be implemented by at least one computing device and may include at least engines 120, 122, 124, 126, 128, and 130 which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of first device 102. In some examples, the at least one machine-readable storage medium may store instructions that, when executed by the at least one processing resource, at least partially implement some or all engines of first device 102. In such examples, first device 102 may include the at least one machine-readable storage medium storing the instructions and the at least one processing resource to execute the instructions.

In an example, selection engine 120 may be used to select performance metrics that are to be collected from first device 102. Selection engine 120 may provide a user interface, for example, a Graphical User Interface (GUI) or a Command Line Interface (CLI), for a user to select performance metrics that are to be collected from first device 102. In an example, second device 104, which may be communicatively coupled to first device 102 either through a direct connection or a computer network may be used to select performance metrics for collection from first device 102. Second device 104 may use the selection engine 120 on first device 102 for making the selection. Some non-limiting examples of the performance metrics that may be selected may include CPU utilization, memory utilization, storage utilization, or network utilization on first device 102.

Once the performance metrics are selected, index engine may be used to index the performance metrics by assigning an index entry, which may be sequence number, to respective performance metrics on first device 102. For example, if performance metrics such as CPU utilization, memory utilization, storage utilization, and network utilization are selected on first device 102, then their identities may be kept in a sequence to assign them unique sequential index value to each of the performance metrics. For example, index entries M1, M2, M3, and M4 may be used to represent identities of performance metrics CPU utilization, memory utilization, storage utilization, and network utilization respectively. This is illustrated in FIG. 2, by way of an example.

Maintenance engine 124 may organize and maintain the identities of the performance metrics in a fixed sequence on first device 102. For example, if index entries M1, M2, M3, and M4 are used to represent identities of performance metrics CPU utilization, memory utilization, storage utilization, and network utilization respectively, then maintenance engine 124 may maintain their identities on first device 102 in a certain sequence, for example, M1, M2, M3, and M4. This is illustrated in FIG. 3, by way of an example.

Sequence engine 126 may share the fixed sequence of the selected performance metrics along with the index entry assigned to the respective performance metrics on first device 102, with second device 104. In this manner, the sequence of performance metrics and their respective index entries would be in-sync on both first device 102 and second device 104. The identities of the selected performance metrics would be maintained in the same sequence both on first device 102 and second device 104.

Determination engine 128 may determine a first performance data of the selected performance metrics on first device 102. For example, if performance metrics include CPU utilization, memory utilization, storage utilization, and network utilization, then the first performance data may include their respective performance metric values such as 85%, 50%, 24%, and 66% respectively. The performance metric values could be any numerical values, and may not necessarily be in percentage.

Transfer engine 130 may share the first performance data of the selected performance metrics with second device 104. In an example, the sharing may comprise sending, to second device 104, the index entry and the first performance data of the respective performance metrics in an order corresponding to the fixed sequence of the performance metrics on first device 102. For example, if index entries M1, M2, M3, and M4 are used to represent identities of performance metrics CPU utilization, memory utilization, storage utilization, and network utilization respectively, and their respective performance metric values are 85%, 50%, 24%, and 66% respectively, then transfer engine 130 may send the data to second device 104, for example, in the following sequence: [M1, 85%], [M2, 50%], [M3, 24%], and [M4, 66%]. In another example, the first performance data may be sent in the following sequence [M1, M2, M3, M4], [85%, 50%, 24%, 66%]. The point to be noted is that the identities of the performance metrics (for example, index entries) and their respective performance metrics are shared with second device 104 according to the fixed sequence defined on first device 102. This is illustrated in FIG. 4, by way of an example.

In an example, determination engine 128 may determine a second performance data of the selected performance metrics. For example, if performance metrics include CPU utilization, memory utilization, storage utilization, and network utilization, then the second performance data may include their respective performance metric values such as 82%, 85%, 34%, and 87% respectively. In an example, determination engine 128 may determine an $n^{th}$ performance data of the selected performance metrics.

Determination engine 128 may further determine whether the second performance data for any of the performance metrics meets a criterion defined on the first device 102. In an example, a criterion(s) may be defined for a performance metric on first device 102. In another example, a criterion(s) on first device 102 may be defined through second device 104. The criterion may include a rule(s) for a performance metric which when met may trigger an action on first device 102. For example, a criterion may be defined for CPU utilization that may comprise a rule that if CPU utilization exceeds a certain pre-defined value, for example, 75%, an action may be initiated on first device 102. Likewise, a criterion(s) may be defined for other performance metrics on first device 102. In an example, first device 102 may receive a request for determining at least one of the first performance data and the second performance data related to the selected performance metrics from second device 104. In response, first device 102 may determine at least one of the first performance data and the second performance data related to the performance metrics in response to a request from the second device 104. In an example, determination engine 128 may determine whether an $n^{th}$ performance data for any of the performance metrics meets a criterion defined on the first device 102

In response to a determination that the second performance data (or the $n^{th}$ performance data) for any of the selected performance metrics meets the criterion defined therefor on first device 102, transfer engine 130 may share the second performance data of the selected performance metrics (or the $n^{th}$ performance data) with second device 104. In an example, the sharing may comprise sending, to second device 104, the index entry and the second performance data of the respective performance metrics in an order corresponding to the fixed sequence of the performance metrics on first device 102.

In another example, the sharing may comprise sending, to second device 104, the index entry and the second performance data of only the impacted performance metrics in an order corresponding to the fixed sequence of the performance metrics on first device 102. In other words, the second performance data of only those performance metrics that meet the criterion defined therefor on first device 102 may be shared with second device 104. In a further example, index engine may be used to represent the second performance data of the selected performance metrics as a binary sequence of Boolean values. In the binary sequence, a true Boolean value may be used to represent the second performance data of a performance metric that meets the criterion defined on first device 102. A false Boolean value may be used to represent the second performance data of a performance metric that does not meet the criterion defined on first device 102. Maintenance engine 124 may organize the second performance data (or the $n^{th}$ performance data) of the performance metrics that meet the criterion defined the first device 102 in an order corresponding to the fixed sequence of the performance metrics on first device 102.

Figure 5:
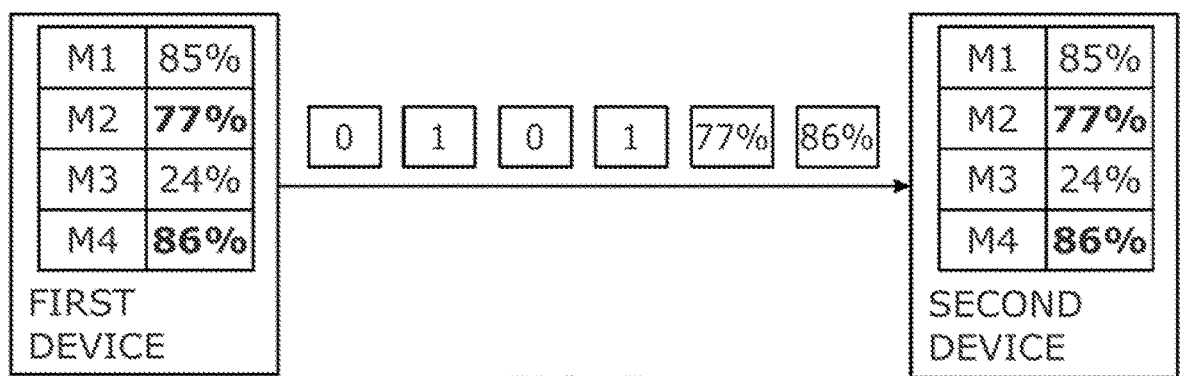
FIG. 5 is a block diagram of an example transfer of Boolean values and performance values in a fixed sequence.

Transfer engine 130 may share the second performance data of the selected performance metrics as the binary sequence of Boolean values with second device 104. Transfer engine 130 may share, with second device 104, the second performance data of the performance metrics that meet the criterion defined on first device 102 in the order corresponding to the fixed sequence of the performance metrics on first device 102. An example is illustrated in FIG. 5.

In response, second device 104 may use the binary sequence of Boolean values and the second performance data of the performance metrics that meet the criterion defined on first device 102, to identify changed performance metrics on first device 102. Second device 104 may use the second performance data of the performance metrics that meet the criterion defined on the first device 102 as current performance data of the changed performance metrics on second device 104.

In an example, the second performance data of the selected performance metrics may be used by second device 104 for monitoring the performance metrics on first device 102. In another example, the second performance data of the selected performance metrics may be used for generating alerts by second device 104.

Figure 6:
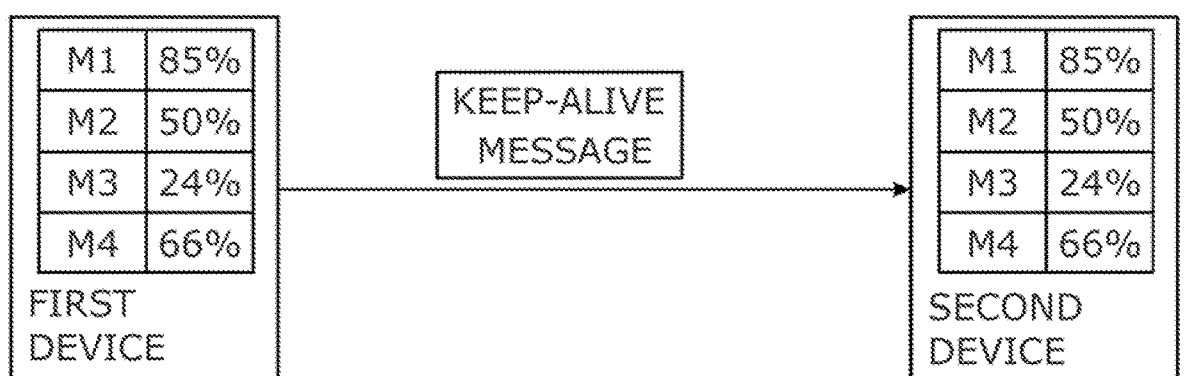
FIG. 6 is a block diagram of an example transfer of a keepalive message.

In response to a determination that the second performance data for any of the selected performance metrics does not meet the criterion defined on first device 102, the second performance data may not be shared with second device 104. If none of the selected performance metrics meet the criterion defined therefor, it may indicate that none of the selected performance metrics have changed to the extent that the rule defined in their respective criteria has been met. In such case, in an example, first device 102 may send a keepalive message(s) to second device 104 to simply indicate that a particular component related to a performance metric is still functional. In response to the keepalive message, second device 104 may use the first performance data of the selected performance metrics as current performance data of the respective performance metrics. This is illustrated in FIG. 6.

There may be performance metrics that may change more frequently than others. For example, CPU utilization, memory utilization etc. On the other hand, some performance metrics may not change often. For example, total disk capacity of a host, total number of CPUs in a host etc. In an example, based on a pre-defined frequency-based criterion, determination engine 128 may determine both such categories of metrics. Those performance metrics that meet the pre-defined frequency-based criterion (e.g., changing more than a pre-defined number of times in a pre-defined time period) may be shared with the second device 104 in a manner described earlier. On the other hand, those performance metrics that do not meet the pre-defined time-based criterion (e.g., do not change more than a pre-defined number of times in a pre-defined time period) may not be shared with the second device 104.

In an example, instead of exact values of the second performance data (or the $n^{th}$ performance data) of the performance metrics, approximate values may be shared with the second device 104. The performance data may transferred only when it crosses from one range to another. To this end, first the whole range may be divided into multiple ranges. For example, for CPU utilization metrics, the possible values may be divided into a range of 0% to 100%, of 5% each interval. In another scenario, if the upper limits of the possible metrics values are not known, but the extent of changes are known (for example, for a metric "Data Transferred per Second") where the fluctuations may be couple of KBs, then for such metrics the increase or decrease of say 10 KB may be considered as a range. For example, if the current value is 86 KB/s and, during next minute interval, if it is 88 KB/s, then they both may be considered in the same window. However, if the value is 67 KB/s or 92 KB/s, then the new value is in another range. Thus in the subsequent interval, if the metric values remain in the same range, then the value may not be shared with the second device.

In an example, index engine may assign a common timestamp to the first performance data of the respective performance metrics on first device 102. Transfer engine 130 may share the common timestamp along with the first performance data with second device 104. This may save network bandwidth during transfer of the first performance data from first device 102 to second device 104, since instead of sharing individual timestamps for the first performance data of the respective performance metrics a single common timestamp is shared. Likewise, index engine may assign a common timestamp to the second or $n^{th}$ performance data of the respective performance metrics on first device 102. Transfer engine 130 may share the common timestamp along with a particular performance date with second device 104.

Figure 7:
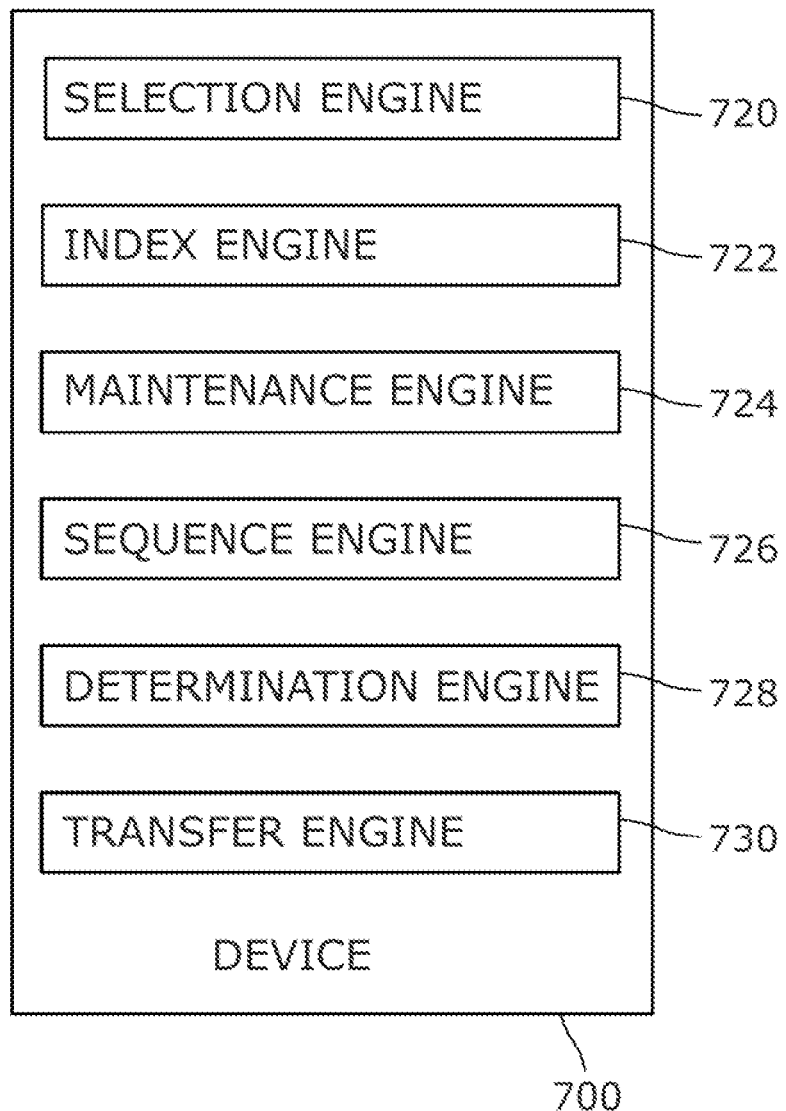
FIG. 7 is a block diagram of an example device that generates performance metrics.

FIG. 7 is a block diagram of an example device 700 for generating performance metrics. In an example, device 700 may be analogous to first device 102 of FIG. 1, in which like reference numerals correspond to the same or similar, though perhaps not identical, components. For the sake of brevity, components or reference numerals of FIG. 7 having a same or similarly described function in FIG. 1 are not being described in connection with FIG. 7. Said components or reference numerals may be considered alike.

In an example, device 700 may represent any type of computing device capable of executing machine-readable instructions. Examples of computing device may include, without limitation, a server, a desktop computer, a notebook computer, a tablet computer, a thin client, a mobile device, a personal digital assistant (PDA), and the like.

In an example, device 700 may be a network device. Examples of the network device may include, without limitation, a network router, a virtual router, a network switch, and a virtual switch.

In an example, device 700 may be a storage device. Examples of the storage device may include, without limitation, a non-transitory machine-readable storage medium that may store, for example, machine executable instructions, data file, and metadata related to a data file. Some non-limiting examples of a non-transitory machine-readable storage medium may include a hard disk, a storage disc (for example, a CD-ROM, a DVD, etc.), a disk array, a storage tape, a solid state drive, a Serial Advanced Technology Attachment (SATA) disk drive, a Fibre Channel (FC) disk drive, a Serial Attached SCSI (SAS) disk drive, a magnetic tape drive, and the like. The storage device may be a direct-attached storage i.e. storage that is directly attached to a node. In an example, the storage device may be an external storage (for example, a storage array) that may communicate with a node via a communication interface.

In an example, device 700 may be may be communicatively coupled to a second device (e.g., second device 104 of FIG. 1), for example, via a computer network.

In an example, device 700 may include a selection engine 720, an index engine 722, a maintenance engine 724, a sequence engine 726, a determination engine 728, and a transfer engine 730. In an example, selection engine 720, index engine 722, maintenance engine 724, sequence engine 726, determination engine 728, and transfer engine 730 may perform functionalities as described in respect of selection engine 120, index engine 122, maintenance engine 124, sequence engine 126, determination engine 128, and transfer engine 130 of FIG. 1.

In an example, selection engine 720 may select performance metrics for collection from device 700. Index engine 722 may index the performance metrics by assigning an index entry to respective performance metrics on device 700. Maintenance engine 724 may maintain a fixed sequence of the performance metrics on device 700. Sequence engine 726 may share the fixed sequence of the performance metrics along with the index entry assigned to the respective performance metrics with a second device. Determination engine 728 may determine a first performance data of the respective performance metrics on device 700. Transfer engine 730 may share the first performance data of the respective performance metrics with the second device. In an example, the sharing may comprises sending, to the second device, the index entry and the first performance data of the respective performance metrics in an order corresponding to the fixed sequence of the performance metrics on device 700.

Figure 8:
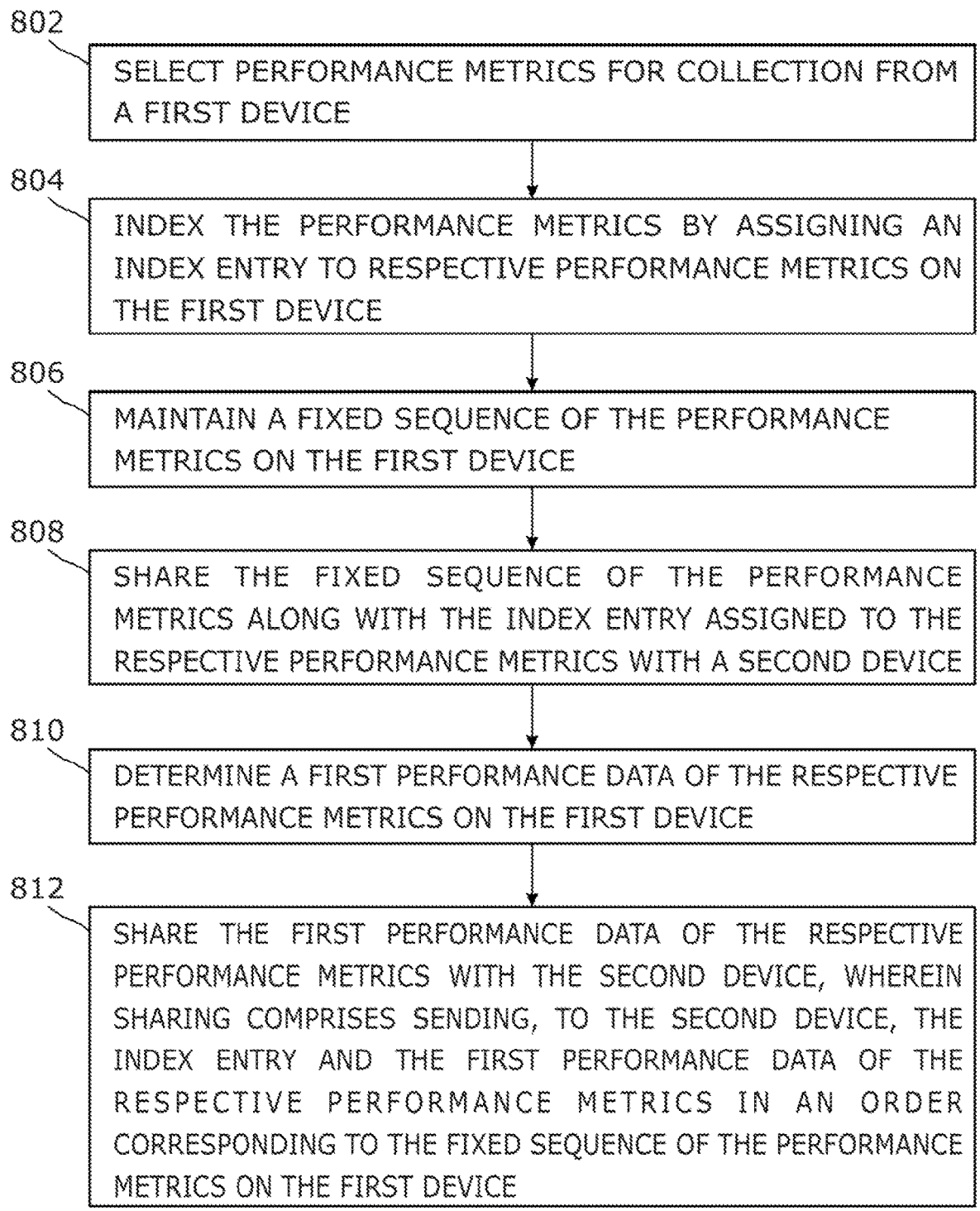
FIG. 8 is a flowchart of an example method of collecting performance metrics of a device.

FIG. 8 is a flowchart of an example method 800 of collecting performance metrics from a device. The method 800, which is described below, may at least partially be executed on a device for example, device 102 of FIG. 1 or device 700 of FIG. 7. However, other computing devices may be used as well. At block 802, performance metrics for collection from a first device may be selected. At block 804, the performance metrics may be indexed by assigning an index entry to respective performance metrics on the first device. At block 806, a fixed sequence of the performance metrics may be maintained on the first device. At block 808, the fixed sequence of the performance metrics along with the index entry assigned to the respective performance metrics may be shared with a second device. At block 810, a first performance data of the respective performance metrics on the first device may be determined. At block 812, the first performance data of the respective performance metrics may be shared with the second device. In an example, the sharing may comprise sending, to the second device, the index entry and the first performance data of the respective performance metrics in an order corresponding to the fixed sequence of the performance metrics on the first device.

Figure 9:
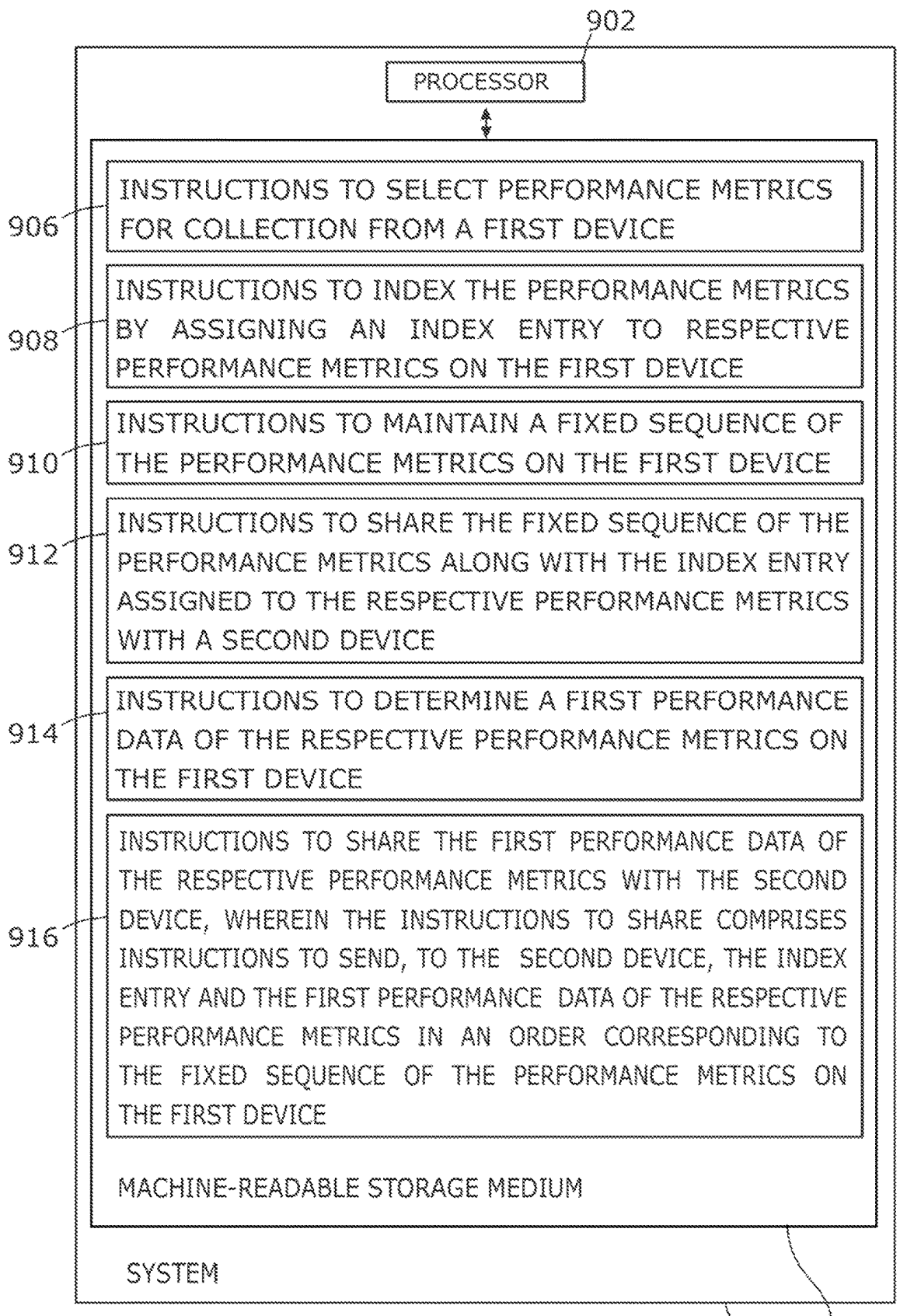
FIG. 9 is a block diagram of an example system including instructions in a machine-readable storage medium for generating performance metrics.

FIG. 9 is a block diagram of an example system 900 including instructions in a machine-readable storage medium for generating performance metrics. System 900 includes a processor 902 and a machine-readable storage medium 904 communicatively coupled through a system bus. In an example, system 900 may be analogous to device 102 of FIG. 1 or device 700 of FIG. 7. Processor 902 may be any type of Central Processing Unit (CPU), microprocessor, or processing logic that interprets and executes machine-readable instructions stored in machine-readable storage medium 904. Machine-readable storage medium 904 may be a random access memory (RAM) or another type of dynamic storage device that may store information and machine-readable instructions that may be executed by processor 902. For example, machine-readable storage medium 904 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 904 may be a non-transitory machine-readable medium. Machine-readable storage medium 904 may store instructions 906, 908, 910, 912, 914, and 916. In an example, instructions 906 may be executed by processor 902 to select performance metrics for collection from a first device. Instructions 908 may be executed by processor 902 to index the performance metrics by assigning an index entry to respective performance metrics on the first device. Instructions 910 may be executed by processor 902 to maintain a fixed sequence of the performance metrics on the first device. Instructions 912 may be executed by processor 902 to share the fixed sequence of the performance metrics along with the index entry assigned to the respective performance metrics with a second device. Instructions 914 may be executed by processor 902 to determine a first performance data of the respective performance metrics on the first device. Instructions 916 may be executed by processor 902 to share the first performance data of the respective performance metrics with the second device. In an example, the instructions to share may comprise instructions to send, to the second device, the index entry and the first performance data of the respective performance metrics in an order corresponding to the fixed sequence of the performance metrics on the first device.

For the purpose of simplicity of explanation, the example method of FIG. 8 is shown as executing serially, however it is to be understood and appreciated that the present and other examples are not limited by the illustrated order. The example systems of FIGS. 1, 2, 3, 4, 5, 6, 7, and 9, and method of FIG. 8 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

The invention claimed is:

1. A method, comprising:
selecting performance metrics for collection from a first device;
indexing the performance metrics by assigning an index entry to respective performance metrics on the first device;
maintaining a fixed sequence of the performance metrics on the first device;
sharing the fixed sequence of the performance metrics along with the index entry assigned to the respective performance metrics with a second device;
determining a first performance data of the respective performance metrics on the first device;
sharing the first performance data of the respective performance metrics with the second device, wherein the sharing comprises sending, to the second device, the index entry and the first performance data of the respective performance metrics in an order corresponding to the fixed sequence of the performance metrics on the first device;
determining a second performance data of the respective performance metrics;
determining whether the second performance data of any of the performance metrics meets a criterion defined on the first device;
in response to a determination that the second performance data of any of the performance metrics meets the criterion defined on the first device, representing the second performance data of the respective performance metrics as a binary sequence of Boolean values, wherein in the binary sequence:
a true Boolean value is used to represent the second performance data of a performance metric that meets the criterion defined on the first device; and
a false Boolean value is used to represent the second performance data of a performance metric that does not meet the criterion defined on the first device; and
sharing the second performance data of the respective performance metrics as the binary sequence of Boolean values with the second device.

2. The method of claim 1, further comprising:
in response to a determination that the second performance data of any of the performance metrics does not meet the criterion defined on the first device, sending, to the second device, a keepalive message.

3. The method of claim 2, wherein:
in response to the keepalive message, the second device uses the first performance data of the respective performance metrics as current performance data of the respective performance metrics on the second device.

4. The method of claim 1, further comprising:
organizing the second performance data of performance metrics that meet the criterion defined on the first device in an order corresponding to the fixed sequence of the performance metrics on the first device.

5. The method of claim 1, further comprising:
sharing, with the second device, the second performance data of the performance metrics that meet the criterion defined on the first device in the order corresponding to the fixed sequence of the performance metrics on the first device.

6. The method of claim 5, wherein:
the binary sequence of Boolean values and the second performance data of the performance metrics that meet the criterion defined on the first device is used by the second device to identify changed performance metrics on the first device; and
the second performance data of the performance metrics that meet the criterion defined on the first device is maintained by the second device as current performance data of the changed performance metrics on the second device.

7. The method of claim 1, wherein:
the second performance data of the respective performance metrics is used by the second device for monitoring the performance metrics on the first device.

8. The method of claim 1, wherein:
the respective performance metrics shared with the second device include performance metrics that meet a pre-defined frequency-based criterion.

9. A device comprising:
a processing resource; and
a non-transitory computer-readable medium, coupled to the processing resource, having stored therein instructions that when executed by the processing resource cause the processing resource to:
select performance metrics for collection from the device;
index the performance metrics by assigning an index entry to respective performance metrics on the device;

maintain a fixed sequence of the performance metrics on the device;
share the fixed sequence of the performance metrics along with the index entry assigned to the respective performance metrics with a second device;
  determine a first performance data of the respective performance metrics on the device;
  share the first performance data of the respective performance metrics with the second device by sending, to the second device, the index entry and the first performance data of the respective performance metrics in an order corresponding to the fixed sequence of the performance metrics on the device;
  determine a second performance data of the respective performance metrics;
  determine whether the second performance data of any of the performance metrics meets a criterion defined on the first device;
  in response to a determination that the second performance data of any of the performance metrics meets the criterion defined on the first device, representing the second performance data of the respective performance metrics as a binary sequence of Boolean values, wherein in the binary sequence:
    a true Boolean value is used to represent the second performance data of a performance metric that meets the criterion defined on the first device; and
    a false Boolean value is used to represent the second performance data of a performance metric that does not meet the criterion defined on the first device; and
  share the second performance data of the respective performance metrics as the binary sequence of Boolean values with the second device.

10. The device of claim 9, wherein the performance metrics for monitoring on the first device are selected through the second device.

11. The device of claim 9, wherein the criterion on the device is defined through the second device.

12. A non-transitory machine-readable storage medium comprising instructions, the instructions executable by a processor to:
  select performance metrics for collection from a first device;
  index the performance metrics by assigning an index entry to respective performance metrics on the first device;
  maintain a fixed sequence of the performance metrics on the first device;
  share the fixed sequence of the performance metrics along with the index entry assigned to the respective performance metrics with a second device;
  determine a first performance data of the respective performance metrics on the first device;
  share the first performance data of the respective performance metrics with the second device, wherein the instructions to share comprises instructions to:
  send, to the second device, the index entry and the first performance data of the respective performance metrics in an order corresponding to the fixed sequence of the performance metrics on the first device;
  determine a second performance data of the respective performance metrics;
  determine whether the second performance data of any of the performance metrics meets a criterion defined on the first device;
  in response to a determination that the second performance data of any of the performance metrics meets the criterion defined on the first device, represent the second performance data of the respective performance metrics as a binary sequence of Boolean values, wherein in the binary sequence:
    a true Boolean value is used to represent the second performance data of a performance metric that meets the criterion defined on the first device; and
    a false Boolean value is used to represent the second performance data of a performance metric that does not meet the criterion defined on the first device; and
  share the second performance data of the respective performance metrics as the binary sequence of Boolean values with the second device.

13. The storage medium of claim 12; wherein the first device is a part of a cloud computing system.

14. The storage medium of claim 12; further comprising instructions to:
  assign a common timestamp to the first performance data of the respective performance metrics on the first device; and
  share the common timestamp with the second device.

15. The storage medium of claim 12, further comprising instructions to receive a request for determining the first performance data related to the performance metrics from the second device.

16. The storage medium of claim 12, wherein the first device is a part of a datacenter.

17. The storage medium of claim 12, further comprising instructions to determine the first performance data related to the performance metrics in response to a request from the second device.

18. The storage medium of claim 12, wherein the second performance data shared with the second device include approximate performance data.

* * * * *